United States Patent
Sagan et al.

(10) Patent No.: US 12,468,914 B2
(45) Date of Patent: Nov. 11, 2025

(54) METHOD AND DEVICE FOR SECURING A DOCUMENT AND METHOD AND DEVICE FOR AUTHENTICATING A DOCUMENT, DOCUMENT SECURED USING SUCH A METHOD

(71) Applicant: ADVANCED TRACK & TRACE, Rueil-Malmaison (FR)

(72) Inventors: Zbigniew Sagan, Rueil-Malmaison (FR); Jean-Pierre Massicot, Rueil-Malmaison (FR)

( * ) Notice: Subject to any disclaimer, the term of this patent is extended or adjusted under 35 U.S.C. 154(b) by 205 days.

(21) Appl. No.: 18/250,756

(22) PCT Filed: Nov. 17, 2021

(86) PCT No.: PCT/EP2021/082020
§ 371 (c)(1),
(2) Date: Apr. 27, 2023

(87) PCT Pub. No.: WO2022/106484
PCT Pub. Date: May 27, 2022

(65) Prior Publication Data
US 2023/0394267 A1    Dec. 7, 2023

(30) Foreign Application Priority Data

Nov. 17, 2020 (FR) .................. FR2011779

(51) Int. Cl.
*G06K 19/06* (2006.01)
(52) U.S. Cl.
CPC . *G06K 19/06056* (2013.01); *G06K 19/06037* (2013.01)
(58) Field of Classification Search
CPC ....... G06K 19/06056; G06K 19/06037; G06K 19/00; G06K 19/06

(Continued)

(56) References Cited

U.S. PATENT DOCUMENTS 8,448,865 B2    5/2013  Picard
2006/0049260 A1*  3/2006  Takahashi ............. G06F 3/0321
                                                235/494
(Continued)

FOREIGN PATENT DOCUMENTS

FR    2902212 A1    12/2007
FR    2953622 A1    6/2011
JP    4198456 B2 *  12/2008  ........... G06F 3/0321

OTHER PUBLICATIONS

ISR; European Patent Office; NL; Feb. 1, 2022.

*Primary Examiner* — Edwyn Labaze
(74) *Attorney, Agent, or Firm* — Patshegen IP; Moshe Pinchas (57) ABSTRACT

A method (30) for securing a document, which comprises:
- a step (301) of statistically determining the average magnitude of an unpredictable print variation;
- a step (302) of generating a message representative of at least one predefined print variation rate;
- a step (307) of encoding the message in a 2D barcode comprising a plurality of cells, the cells comprising two areas:
- a first area representing a symbol and
- a second area, representing a matrix of dots of dimensions smaller than the dimensions of the second area and having at least one geometric characteristic similar to the amplitude of the statistically determined unpredictable print variation; and
- a step (310) of printing the document with the barcode, the print causing the unpredictable variation.

17 Claims, 5 Drawing Sheets

(58) Field of Classification Search
USPC .................. 235/494, 487, 462.09, 462.1, 375
See application file for complete search history.

(56) References Cited

U.S. PATENT DOCUMENTS

2010/0014122 A1* 1/2010 Massicot .............. G07D 7/2033
                                                      358/3.28
2012/0311320 A1* 12/2012 Brown .................. H04L 9/0894
                                                      713/155

* cited by examiner

METHOD AND DEVICE FOR SECURING A DOCUMENT AND METHOD AND DEVICE FOR AUTHENTICATING A DOCUMENT, DOCUMENT SECURED USING SUCH A METHOD

TECHNICAL FIELD OF THE INVENTION

The present invention relates to a method and device for securing a document, a method and a device for authenticating a document, and a document secured by such a method. It applies in particular to the field of combating the counterfeiting of documents such as contracts or products in the luxury industry.

STATE OF THE ART

Currently, the protection of documents is performed by affixing watermarks invisible to the naked eye, the degradation or absence of which makes it possible to identify a non-authentic document. This solution makes it possible to be invisible, but requires very specific means for verifying the authenticity of documents.

There are also documents protected by the application of two-dimensional (2D) barcodes; however, the space for storing information in these barcodes is limited and can be restricted by the space available on the document to be protected or to avoid being too large relative to the document to be protected and make it unattractive. However, these barcodes can have a fragile portion and a robust portion impossible to produce with watermarks. The fact of combining a robust mark and a fragile mark enables the authentication of the document to be made easier.

The term 'document' includes all data carriers, for example hardcopy documents, blueprints, packaging, manufactured items, moulded items and cards, e.g. identification cards or bankcards.

Therefore, in the securing of documents one difficulty is to minimise the space taken by the 2D barcodes while enabling the easy detection of the authenticity of the document.

Patent application FR 2 902 212 is known, which discloses a distribution of dots whose location, shape and/or position are variable. However, this application in no way discloses a cell comprising two different areas.

U.S. Pat. No. 8,448,865 is known, which discloses a Data Matrix in which pixels have been added or removed to create errors on printing.

French patent application FR 2 953 622 is also known, which discloses characters distributed over an image without definition of cells or areas.

DESCRIPTION OF THE INVENTION

The present invention aims to remedy all or part of these drawbacks.

To this end, according to a first aspect, the present invention envisions a method for securing a document, which comprises:
  a step of statistically determining the average amplitude of an unpredictable print variation, dot by dot, of at least one geometric characteristic among the dimensions, shape and/or position of the dot;
  a step of generating a message representative of at least one predefined print variation rate; and
  a step of encoding the message generated in a 2D barcode comprising a plurality of cells, at least one cell comprising at least one set of two areas (105, 106), each area comprising a plurality of dots, a set comprising:
    a first area representing a symbol and
    a second area, different from the first area, representing a matrix of dots, a matrix of dimensions smaller than the dimensions of the second area and having at least one geometric characteristic, among the dimensions, shape and/or position, of the order of magnitude of the average amplitude of the statistically determined unpredictable print variation; and
  a step of printing the document with the barcode, this printing, as a result of unanticipated unknowns in printing, causing an unpredictable variation, dot by dot, of at least one geometric characteristic of the printed dots among the dimensions, shape and/or position, the printed 2D barcode therefore representing two variations, one generated and the other unpredictable dot by dot.

Thanks to these provisions, information that may be public can be displayed in the first area of cells. This information does not therefore need to be encoded so as to be hidden in the message, thus freeing space. In addition, the matrix of the second area is fragile, and thus enables an easy authentication of documents.

Lastly, as the message comprises the predefined print variation rate necessary to authenticate the document, it is not necessary to access external resources to carry out the authentication.

In some embodiments, the message comprises a rate of redundancies configured to correct reading errors linked to predictable and unpredictable print variations.

These embodiments allow the message to be read regardless of the degradation the document has undergone.

In some embodiments, the message represents at least the step of encoding at least each first area and/or each second area of the 2D barcode.

The advantage of these embodiments is to be able to reconstitute each first area and/or each second area for making a dot-by-dot comparison during authentication.

In some embodiments, the message represents at least one access to the barcode stored in a memory.

The advantage of these embodiments is to be able to access barcodes before printing for making a dot-by-dot comparison during authentication.

In some embodiments, for at least one cell, at least one geometric characteristic, among the dimensions, shape and/or position of the matrix of the second area, is dependent on the symbol represented in the first area.

Thanks to these provisions, a counterfeit in which the symbols are modified can be identified easily.

In some embodiments, the message represents a weighted combination of at least two predefined print variation rates.

The advantage of using such a combination is to make the task more complicated for a possible counterfeiter since several means for verifying the authenticity of a document are combined in a way known only to the issuer of the document.

In some embodiments, each set of one cell has an equal number of dots.

Thanks to these provisions, it is possible to store more information in the cells by defining characters having standardised dimensions.

In some embodiments, at least one portion of the message is represented in at least one portion of the symbols of at least one cell.

Thanks to these provisions, it is possible to store a longer message, in particular for an item of information in the message that is not secret.

According to a second aspect, the present invention envisions a method for authenticating a document comprising a 2D barcode comprising a plurality of cells, at least one cell comprising at least one set of two areas (105, 106), each area comprising a plurality of dots, a set comprising:
- a first area representing a symbol and
- a second area, different from the first area, representing a matrix of dots, a matrix of dimensions smaller than the dimensions of the second area, the method comprising:
- a step of capturing an image of a 2D barcode printed with the document;
- a step of decoding a message encoded in the captured barcode, the message comprising at least one predefined print variation rate;
- a step of determining an unpredictable print variation rate of the captured barcode;
- a step of comparing variation rates;
- a step of verifying the authenticity of the document on the basis of the result of the comparison.

In some embodiments, the step of determining an unpredictable print variation rate comprises a step calculating a rate of redundancies used, during the decoding step, to correct reading errors linked to predictable and unpredictable print variations.

In some embodiments, the step of determining a print variation rate comprises:
- a step of encoding at least each first area and/or each second area of the 2D barcode; and
- a step of the dot-by-dot comparison of each first area and/or each second area of the 2D barcode captured and of the barcode encoded, the result of the comparison being the determined print variation rate.

In some embodiments, the step of determining a variation rate comprises:
- a step of accessing the barcode stored in a memory;
- a step of the dot-by-dot comparison of each first area and/or each second area of the 2D barcode captured and of the barcode memorised, the result of the comparison being the determined print variation rate.

In some embodiments, the dot-by-dot comparison step comprises a step of verifying, for each set of each cell, the correspondence between the symbol and a geometric characteristic, among the dimensions, shape and/or position of the matrix of the second area.

In some embodiments, the message represents a weighted combination of at least two predefined print variation rates, and during the determination step at least two unpredictable print variation rates of the captured barcode corresponding to the predefined print variation rates are combined.

As the particular aims, advantages and features of the authentication method that is the subject of the present invention are similar to those of the securing method that is the subject of the present invention, they are not repeated here.

According to a third aspect, the present invention envisions a device for securing a document, which comprises:
- a means for statistically determining the average amplitude of an unpredictable print variation, dot by dot, of at least one geometric characteristic among the dimensions, shape and/or position of the dot;
- a means for generating a message representative of at least one predefined print variation rate;
- a means for encoding the message generated in a 2D barcode comprising a plurality of cells, at least one cell comprising at least one set of two areas (105, 106), each area comprising a plurality of dots, a set comprising:
  - a first area representing a symbol and
  - a second area, different from the first area, representing a matrix of dots, a matrix of dimensions smaller than the dimensions of the second area and having at least one geometric characteristic, among the dimensions, shape and/or position, of the order of magnitude of the average amplitude of the statistically determined unpredictable print variation; and
- a means for printing the document with the barcode, this printing, as a result of unanticipated unknowns in printing, causing an unpredictable variation, dot by dot, of at least one geometric characteristic of the printed dots among the dimensions, shape and/or position, the printed 2D barcode therefore representing two variations, one generated and the other unpredictable dot by dot.

As the particular aims, advantages and features of the securing device that is the subject of the present invention are similar to those of the securing method that is the subject of the present invention, they are not repeated here.

According to a fourth aspect, the present invention envisions a device for authenticating a document comprising a 2D barcode comprising a plurality of cells, at least one cell comprising at least one set of two areas (105, 106), each area comprising a plurality of dots, a set comprising:
- a first area representing a symbol and
- a second area, different from the first area, representing a matrix of dots, a matrix of dimensions smaller than the dimensions of the second area, the device comprising:
- a means for capturing an image of a 2D barcode printed with this document;
- a means for decoding a message encoded in the captured barcode, the message comprising at least one predefined print variation rate;
- a means for determining an unpredictable print variation rate of the captured barcode;
- a means for comparing variation rates;
- a means for verifying the authenticity of the document on the basis of the result of the comparison.

As the particular aims, advantages and features of the authentication device that is the subject of the present invention are similar to those of the authentication method that is the subject of the present invention, they are not repeated here.

According to a fifth aspect, the present invention envisions a document secured by a securing method that is the subject of the present invention.

As the particular aims, advantages and features of the document that is the subject of the present invention are similar to those of the securing method that is the subject of the present invention, they are not repeated here.

BRIEF DESCRIPTION OF THE FIGURES

Other advantages, aims and particular features of the invention will become apparent from the non-limiting description that follows of at least one particular embodiment of the securing method and device, the authentication method and device and the document that are the subjects of the present invention, with reference to drawings included in an appendix, wherein.

DESCRIPTION OF THE EMBODIMENTS

The present description is given in a non-limiting way, in which each characteristic of an embodiment can be combined with any other characteristic of any other embodiment in an advantageous way.

Note that FIGS. 1, 2, 8, and 9 are to scale but can be at different scales, and FIGS. 3 to 7 are not to scale.

Before giving the details of the various particular embodiments of the present invention, the definitions that will be used in the description are given below.

Document: Any concrete item, perceptible to the eye, through touch, e.g. an electronic chip, paper or packaging on which an item of information is marked.

Dot: the smallest element for marking an object, e.g. a dot on a physical object relative to a pixel.

Cell: a set of dots defined by at least two dimensions in a number of dots, the shape of a cell can be any known shape, e.g. a square, a rectangle or a circle.

Two-dimensional (2D) barcode: a two-dimensional graphic code comprising cells, e.g. square, each cell having at least one colour among two distinct colours, examples of 2D barcodes are QR (registered trademark, acronym for "Quick Response") codes, Data Matrix codes, Semacodes (registered trademark).

Print: the affixing or marking of a digital graphic element on or in the mass of an object, for example by laser engraving or printing.

Fragile anti-copy mark: a mark whose degradation by the noise during marking and then copying, i.e. the generation of individually unpredictable ad-hoc errors, leading to a dot being interpreted with an incorrect value, whose rate can be measured and checked to distinguish an original from a copy.

Order of magnitude: a physical dimension A is of the same order of magnitude as a physical dimension B if the value of A is between one tenth and ten times the value of B and, preferably, between one half and two times.

Area: a continuous portion of a cell with dimensions smaller than the dimensions of the cell.

Dot matrix: a set of dots representing an item of information.

Unpredictable print variation, dot by dot: errors between the code generated and its print due to the print process. It is impossible to predict which dots are incorrect, but the error rate can be determined statistically.

Symbol: an object, image, character, or specific mark that represents something else, by association, similarity or convention. A symbol can be, for example, an alphanumeric character.

It is also noted that, during printing, print errors due to the print process are produced. During a capture, for example by scanning or taking a photograph of a document, other print errors are produced. Consequently, when a document is copied, this document has already been printed once and it has to be scanned and re-printed, thus the print process has already taken place twice, thereby increasing the error rate relative to the digital representation of the original document. Lastly, during the capture of the copy, other capture errors are produced.

An original can therefore be distinguished from a copy by comparing an error rate with a statistically determined threshold representing an error rate at which the document is known to be a copy.

In the remainder of the description, the cells and the 2D barcodes have a square shape by way of illustration. The person skilled in the art will be able to use cells and 2D barcodes with different shapes, e.g. circular or rectangular.

The term "top" refers to what is shown in the top in FIGS. 1, 2, 8 and 9, "bottom" refers to what is shown in the bottom in FIGS. 1, 2, 8 and 9, "left" to what is shown on the left in FIGS. 1, 2, 8 and 9, and "right" to what is shown on the right in FIGS. 1, 2, 8 and 9.

Figure 1:
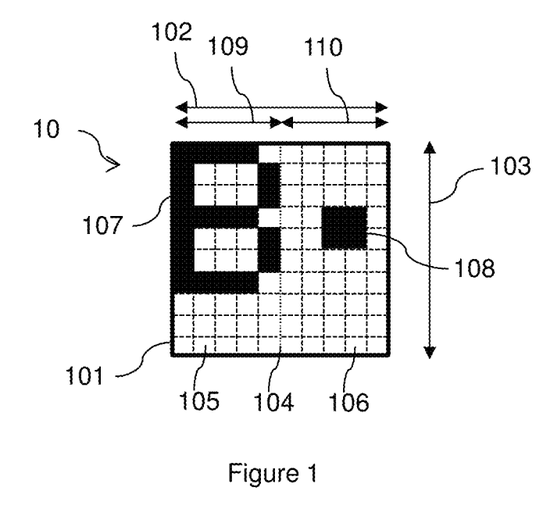
FIG. 1 represents, schematically, a first embodiment of a cell of a 2D barcode for securing a document according to the method that is the subject of the present invention.

FIG. 1, which is not to scale, shows a schematic view of an embodiment of a cell 10 of a 2D barcode 20, 80, 90 that is the subject of the present invention. The cell 10 comprises a single set of two areas 105 and 106.

In the embodiment shown, the cell 10 is a square surface 101 and has one side, called "width", 102 equal to ten dots and an adjacent perpendicular side, called "length", 103 equal to ten dots.

The cell 10 comprises two areas 105 and 106. In the embodiment shown, each area has the same length 103 equal to ten dots and a width of five dots. The separation between the areas is shown by the dotted line 104.

A symbol 107 is shown in a first area 105. The symbol 107 can be any known alphanumeric character, for example. In the embodiment shown, the symbol 107 is the uppercase letter "B" aligned in the top left corner of the cell 10.

Preferably, the matrix of dots 108 has at least one dimension less than or equal to half the dimension of the symbol 107. Even more preferably, the largest dimension of the matrix of dots 108 has at least one dimension less than or equal to half of the smallest dimension of the symbol 107. Even more preferably, the largest dimension of the matrix of dots 108 has at least one dimension less than or equal to one third of the smallest dimension of the symbol 107. Even more preferably, the largest dimension of the matrix of dots 108 has at least one dimension less than or equal to one quarter of the smallest dimension of the symbol 107.

A matrix of dots 108 is shown in a second area 106. The matrix of dots has dimensions smaller than the dimensions 103 and 110 of the second area. The matrix of dots also has at least one geometric characteristic, among the dimensions, shape and/or position, of the order of magnitude of the average amplitude of the statistically determined unpredictable print variation.

The person skilled in the art can, in particular, draw on international patent application WO 2009/004 172, which explains how to determine the average amplitude of the statistically determined unpredictable print variation.

In the embodiment shown, the matrix of dots 108 has a square shape of two dots by two dots. The matrix of dots 108 is positioned at three dots from the top edge of the cell 10 and one dot from the right edge of the cell 10.

The position of the symbol in the first area can be defined during the encoding of the message according to the symbol and/or the matrix of dots 108 in the second area. The position, dimensions or shape of the matrix of dots 108 in the second area 106 can be defined during the encoding of the message according to the symbol and/or the position of the symbol in the first area.

In some embodiments, the symbol 107 defines the dimensions of the first area. For example, the limits of the first area correspond to the periphery of the symbol 107. The second area therefore comprises all the dots of the cell or, in other embodiments, of the set, that are not in the first area.

In some embodiments, the matrix of dots surrounded by a number of dots corresponding to the order of magnitude of the average amplitude of the statistically determined unpredictable print variation, define the second area. The first area therefore comprises all the dots of the cell or, in other embodiments, of the set, that are not in the first area.

Preferably, each set is contained within a single cell. In other words, a set of two areas does not straddle two cells.

In other embodiments, a set of two areas can be represented over several cells.

In some embodiments in which each cell comprises at least two sets, the second area is comprised of the set of pixels that are not in the first area of the same set.

Preferably, the dimensions of the sets are predefined during the encoding step 307. For example, each set of one cell has an equal number of dots. Alternatively, each set of one cell has a different number of dots.

In some embodiments, in the case of the uppercase letter "B", the first area could therefore be an area five pixels wide by seven pixels long in the top left of the surface 101 of the cell 10. The second area therefore forms a corner comprising the pixels outside the first area. Thus the second area has a shape that varies according to the symbol 107. The number of positions of the matrix of dots 108 in the second area is therefore greater.

Figure 2:
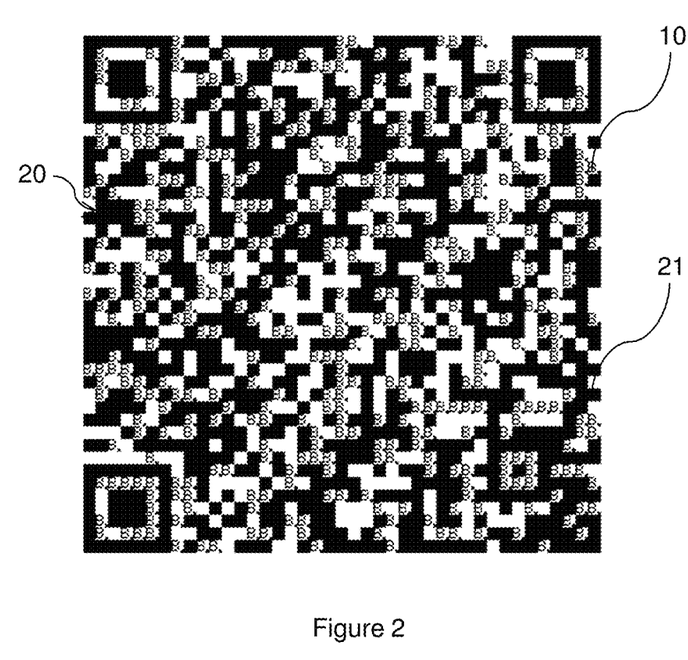
FIG. 2 represents, schematically, a first embodiment of a 2D barcode for securing a document according to the method that is the subject of the present invention.

FIG. 2 shows a 2D barcode 20 encoded according to the method that is the subject of the present invention.

FIG. 2 represents a 2D barcode 20 comprising an encoded message. The encoded message is represented by square cells 21, white or black. The 2D barcode 20 is a QR code that can be recognised by three orientation blocks of the code in three corners of the code. A cell initially encoded to be white has been replaced by the cell 10. The 2D barcode 20 can comprise cells 21 that do not comprise two areas as described with regard to FIG. 1. The cell can be monochrome, or represent a symbol or a matrix of dots as detailed above with regard to FIG. 1, for example.

Figure 8:
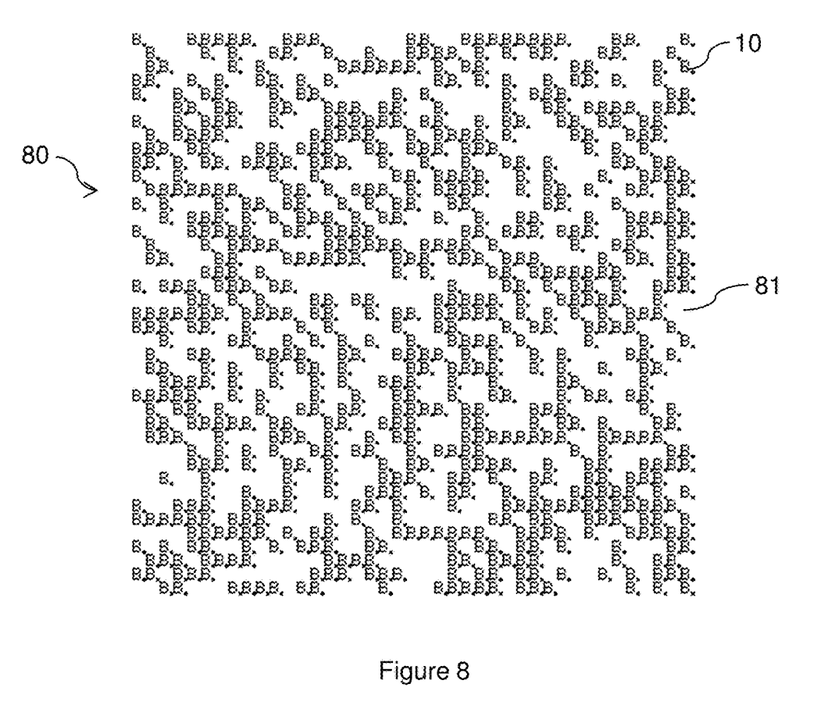
FIG. 8 represents, schematically, a second embodiment of a 2D barcode for securing a document according to the method that is the subject of the present invention.

FIG. 8 shows a second embodiment of a 2D barcode 80 encoded according to the method that is the subject of the present invention. In the embodiment shown in FIG. 8, the 2D barcode is not a QR code and all the cells initially encoded to be black have been replaced by the cell 10.

Figure 9:
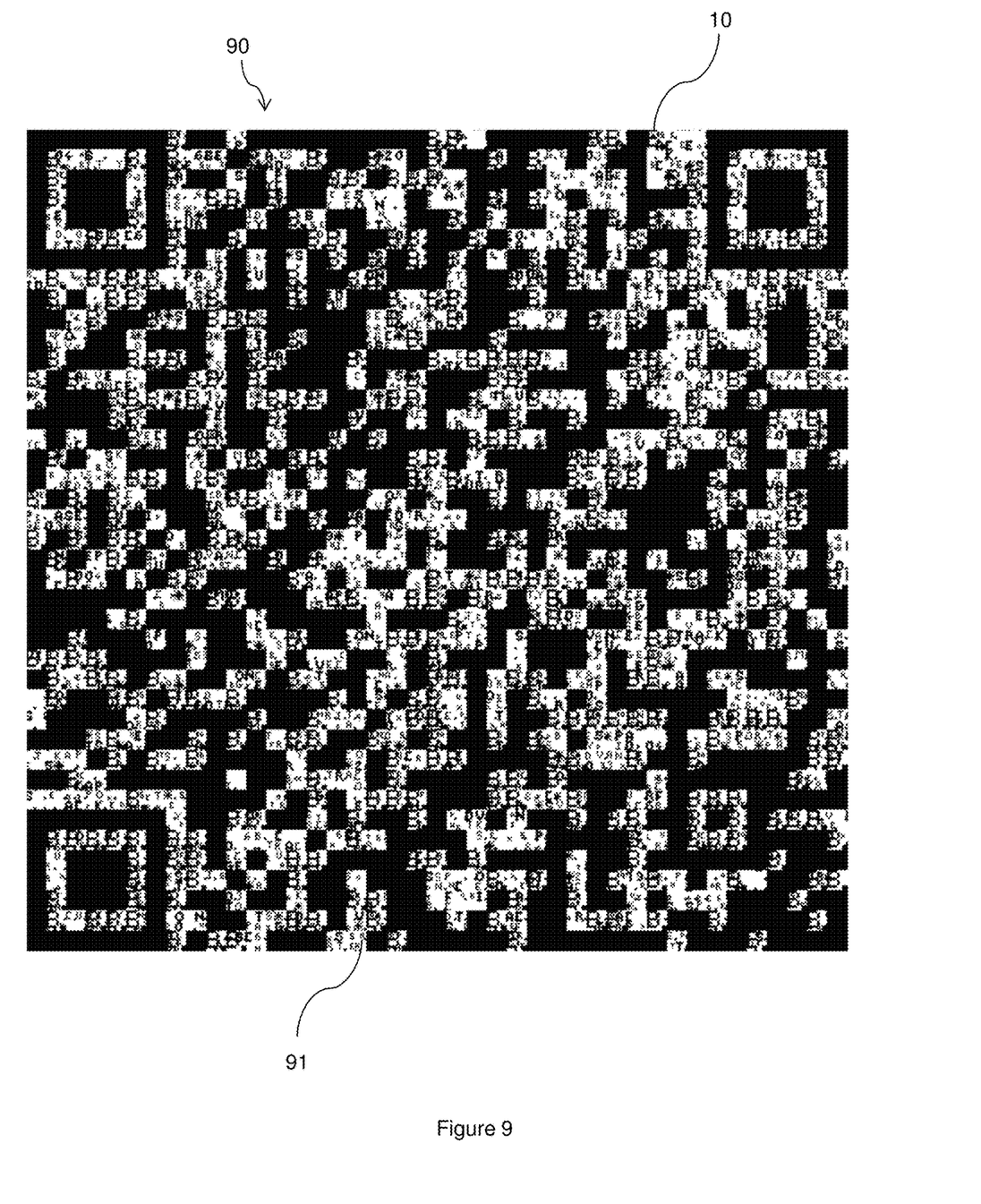
FIG. 9 represents, schematically, a third embodiment of a 2D barcode for securing a document according to the method that is the subject of the present invention.

FIG. 9 shows a 2D barcode 90 encoded according to the method that is the subject of the present invention. Compared to FIG. 2, some cells have several sets.

Figure 3:
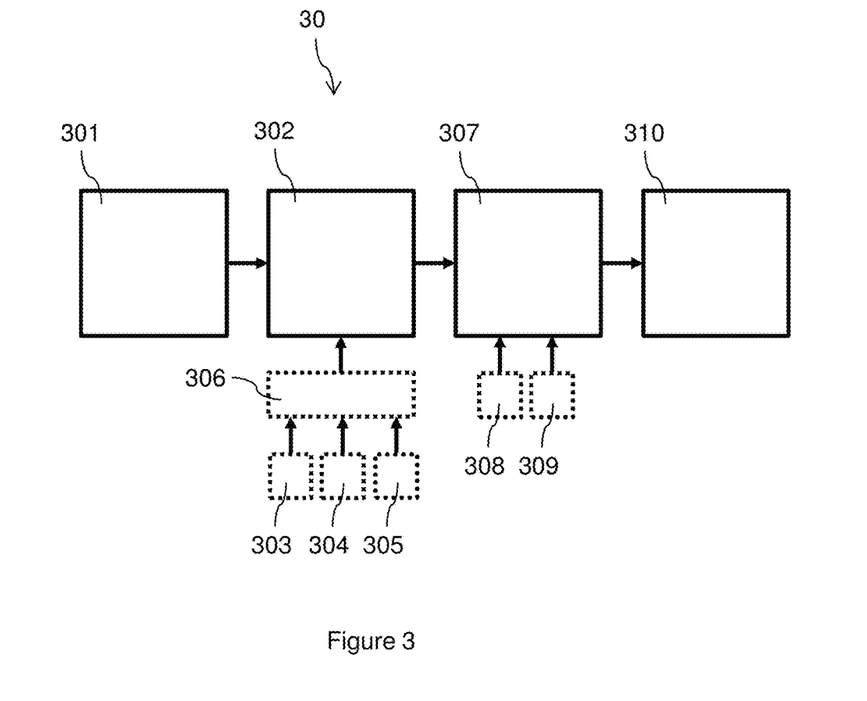
FIG. 3 represents, schematically and in the form of a logical diagram, a particular series of steps of the securing method that is the subject of the present invention.

FIG. 3 shows a series of steps of the securing method 300 that is the subject of the present invention.

The method 300 comprises a step 301 of statistically determining the average amplitude of an unpredictable print variation, dot by dot, of at least one geometric characteristic among the dimensions, shape and/or position of the dot.

The determination step 301 is detailed in international patent application WO 2009/004 172, which details printing by the print means of the document that will be used in the method 300 of different samples of different sizes, making it possible to determine the average amplitude of an unpredictable print variation, dot by dot. In particular, for different sample sizes, the same sample is printed several times and, depending on the print resolution, the print variation rate is measured according to the size of the samples. A variation rate is chosen that allows a fragile anti-copy mark to be created, for example greater than five percent.

After determining the average amplitude, one proceeds to a step 302 of generating a message representative of at least one predefined print variation rate.

In some embodiments, the message comprises a rate of redundancies configured to correct reading errors linked to predictable and unpredictable print variations. For example, the message can represent an element repeated at least three times to enable an error to be detected and corrected. Preferably, the repeated element, for example at least one predefined rate of print variations, is repeated at least five times.

In some preferred embodiments, the message comprises a code for detecting or correcting errors.

In some embodiments, at least one portion of the message is represented in at least one portion of the symbols of at least one cell. For example, the portion of the message represented is a public portion, such as the address of a website.

In the embodiments in which the message comprises redundancies for correcting the reading errors linked to predictable and unpredictable print variations, a predefined print variation rate 303 represented by the message corresponds to a maximum rate of redundancies used to correct the errors for capturing an original document. As indicated above, a copy will have a higher error rate, and it is therefore necessary to have greater use of redundancies for decoding the message than for an original.

In some embodiments, the message represents at least one step 307 of encoding at least each first area 105 and/or each second area 106 of the 2D barcode 20, 80, 90. During authentication, each first area and/or each second area of the 2D barcode 20, 80, 90 can be generated again and a dot-by-dot comparison can be carried out to determine the error rate between the areas generated and those read. The predefined print variation rate 304 is therefore a dot-by-dot error rate.

In some embodiments, the message represents at least one access to the 2D barcode 20, 80, 90 memorised. The access can be an access to a remote memory, for example a computer server. The access can be secured by means of a key contained in the message. The encoded barcodes can be accessed and a dot-by-dot comparison can be carried out to determine the error rate between the memorised code and the code read. The predefined print variation rate 305 is therefore a dot-by-dot error rate.

The message can comprise, in addition to at least one predefined print variation rate, an access to a step of determining an unpredictable print variation rate during the authentication of the document.

The accesses mentioned above are a secure method of connection to a website or a remote server, for example, the message therefore comprising a secret key configured for authentication.

During the generation step 302 the generated message can comprise one or more predefined print variation rates. These rates correspond to different ways of verifying the authenticity of a document. In some embodiments, the message represents a weighted combination 306 of at least two predefined print variation rates.

To represent the combination 306, the message can comprise the different predefined print variation rates to be combined and a weighting linked to each predefined print variation rate. When the message comprises several predefined print variation rates, the message can comprise a step of the weighted combination of predefined print variation rates or an access to a remote server implementing such a step.

In other embodiments, each predefined print variation rate can be linked to a score. The combination 306 represented in the message can represent a combination of scores or a matrix of scores.

The predefined print variation rates can also concern a single area of cells 10, for example each first area or each second area. A first predefined print variation rate can concern all the first areas and a second predefined print variation rate can concern all the second areas. Of course, a combination of these predefined print variation rates can be represented in the message.

The message can also represent other information, for example information linked to the document 70 on which the 2D barcode 20, 80, 90 is printed.

The method then comprises a step 307 of encoding the message generated in a 2D barcode 20, 80, 90 comprising a plurality of cells 10 and 21, 81, 91, at least one cell 10 comprising at least one set of two areas 105, 106, each area 105, 106 comprising a plurality of dots, a set comprising:
  a first area 105 representing a symbol 107 and
  a second area 106, different from the first area 105, representing a matrix of dots 108, a matrix 108 of dimensions smaller than the dimensions, 103 and 110, of the second area 106 and having at least one geometric characteristic, among the dimensions, shape and/or position, of the order of magnitude of the average amplitude of the statistically determined unpredictable print variation.

The 2D barcode 20, 80, 90 corresponds to the description made with regard to FIGS. 2, 8, and 9.

In some embodiments, the encoding step comprises the following steps:
  a step of determining a maximum size of cell 10 of a 2D barcode 20, 80, 90, the dimensions of the cell 10 being defined by a surface containing a quantity of dots;
  a step of estimating a minimum quantity of dots of a predefined colour, referred to as "main colour, in a cell 10 such that the cell 10 is detected as having this colour by a predefined capture means; and
  for at least one cell 10, a step of defining the symbol and matrix of dots to be represented in this cell 10, the quantity of dots of the image having the colour defining the cell 10 being greater than or equal to the estimated minimum quantity.

These embodiments make it possible to encode an additional quantity of information in the 2D barcode 20, 80, 90 since a capture means can still read cells as being one colour or another and representing, for example, a second message or public elements.

The encoding step can be carried out using a cryptographic key by methods known to the person skilled in the art.

In some embodiments, for at least one cell 10, at least one geometric characteristic, among the dimensions, shape and/or position of the matrix 108 of the second area 106, is dependent on the symbol 107 represented in the first area 105. The encoding step therefore comprises a mapping 308 of the symbol 107 and the matrix 108.

In some embodiments, for at least one cell 10, the encoding step comprises a step 309 of defining dimensions of the second area 106 according to the symbol 107 represented in the first area 105.

These steps are detailed with regard to FIG. 1.

The method 30 comprises a step 310 of printing the document with the barcode 20, 80, 90, this printing, as a result of unanticipated unknowns in printing, causing an unpredictable variation, dot by dot, of at least one geometric characteristic of the printed dots among the dimensions, shape and/or position, the printed 2D barcode 20, 80, 90 therefore representing two variations, one generated and the other unpredictable dot by dot.

The generated print variation concerns the matrix of dots 108 whose geometric characteristics generate the variation of a geometric characteristic of the printed dots among the dimensions, shape and/or position relative to the digital 2D barcode 20, 80, 90, during printing.

Figure 4:
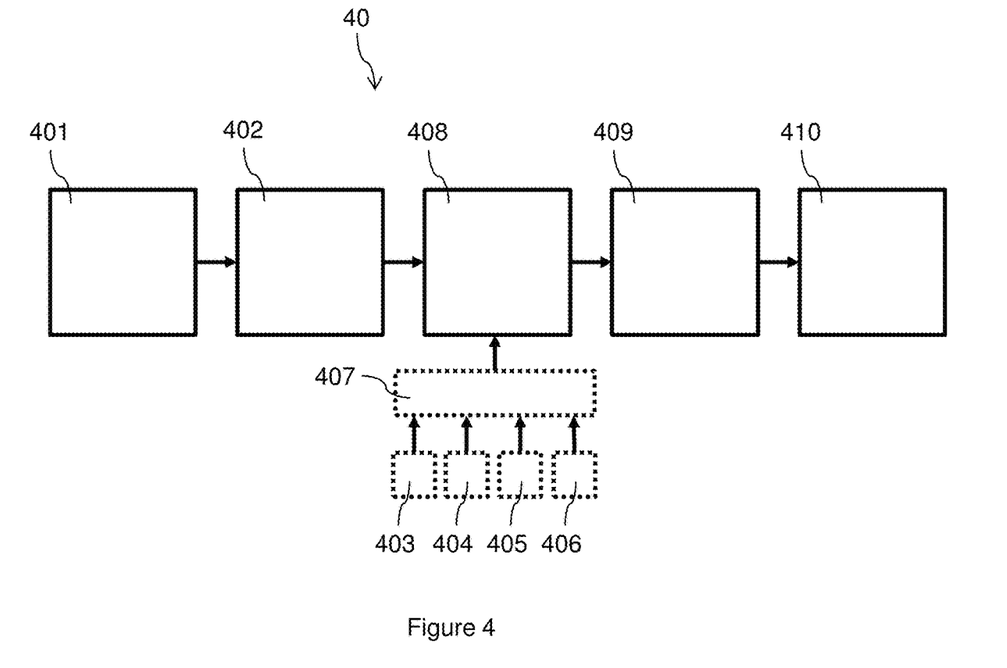
FIG. 4 represents schematically, in the form of a logic diagram, a particular series of steps of the authentication method that is the subject of the present invention.

FIG. 4 shows, in the form of a logical diagram, a method 40 for authenticating a document comprising a 2D barcode 20, 80, 90.

The 2D barcode 20, 80, 90 on the document to be authenticated is comprised of a plurality of cells, 10 and 21, 81, 91, at least one cell 10 comprising at least one set of two areas 105, 106, each area 105, 106 comprising a plurality of dots, a set comprising:
  a first area 105 representing a symbol 107 and
  a second area 106, different from the first area 105, representing a matrix of dots 108, a matrix of dimensions smaller than the dimensions of the second area 106.

The method 40 comprises a step 401 of capturing an image of a 2D barcode printed with the document.

The capture step 401 can be carried out by any means known to the person skilled in the art, for example by means of a scanner, photo camera or camera.

The method 40 therefore comprises a step 401 of decoding a message encoded in the captured barcode, the message comprising at least one predefined print variation rate.

The message can also represent other information, for example information linked to the document 70 on which the 2D barcode 20, 80, 90 is printed.

During the decoding step 402 the message can comprise a rate of redundancies. A step of correcting the reading errors linked to predictable and unpredictable print variations is therefore implemented to reconstitute the message. In some embodiments, the decoding step comprises a step of detecting errors.

The method 40 also comprises a step 408 of determining an unpredictable print variation rate of the captured barcode. The determination step 408 to be implemented can be represented in the message. For example by means of access to a remote server that implements steps of a computer program.

In the embodiments in which the message comprises redundancies for correcting the reading errors linked to predictable and unpredictable print variations, the step 408 of determining an unpredictable print variation rate comprises a step 403 calculating a rate of redundancies used, during the decoding step 402, to correct reading errors linked to predictable and unpredictable print variations. As indicated above, a copy will have a higher error rate, and it is therefore necessary to have greater use of redundancies for decoding the message than for an original.

In some embodiments, the step 408 of determining a print variation rate comprises:
- a step 404 of encoding at least each first area and/or each second area of the 2D barcode; and
- a step 404 of the dot-by-dot comparison of each first area and/or each second area of the 2D barcode captured and of the barcode encoded, the result of the comparison being the determined print variation rate.

During the encoding step 404, the set of first areas and/or second areas is generated again in the same way as the encoding step 307 of the securing method 30 with the message decoded during the decoding step 402.

Then a dot-by-dot comparison 404 of the generated areas is carried out to determine a print variation rate that is equal to the error rate detected during the comparison.

In some embodiments, the message represents at least one access to the barcode stored in a memory. In these embodiments, the step 408 of determining a variation rate comprises:
- a step 405 of accessing the barcode 20, 80, 90 stored in a memory;
- a step 405 of the dot-by-dot comparison of each first area and/or each second area of the 2D barcode captured and of the barcode memorised, the result of the comparison being the determined print variation rate.

The access 405 is represented in the decoded message. The access 405 can be an access to a remote memory, for example a computer server. The access 405 can be secured by means of a key contained in the message. The memorised barcode can be accessed and a dot-by-dot comparison 405 can be carried out to determine the error rate between the memorised code and the code read. The print variation rate determined is therefore an error rate detected during the comparison.

In some embodiments, the message represents a weighted combination of at least two predefined print variation rates, and during the determination step 408 at least two unpredictable print variation rates of the captured barcode, corresponding to the predefined print variation rates, are combined 407.

The decoded message can comprise one or more predefined print variation rates. These rates correspond to different ways of verifying the authenticity of a document.

The message can comprise the different predefined print variation rates to be combined and a weighting linked to each predefined print variation rate. In other embodiments, each predefined print variation rate can be linked to a score. The combination 407 represented in the message can represent a combination of scores or a matrix of scores.

The authentication method 40 can comprise a step 407 of the weighted combination of predefined print variation rates according to the combination and weighting information represented in the message. The combination step is possibly preceded by a step of accessing a combination application, for example on a remote server.

The predefined print variation rates can also concern a single area of cells, for example each first area or each second area. A first predefined print variation rate can concern all the first areas and a second predefined print variation rate can concern all the second areas. Of course, a combination 407 of these predefined print variation rates can be represented in the message.

The accesses mentioned above are a secure method of connection to a website or a remote server, for example, the message therefore comprising a secret key configured for authentication.

In some embodiments, the step, 404 and/or 405, of the dot-by-dot comparison of a variation rate comprises a step 406 of verifying, for each set of each cell 10, the correspondence between the symbol and a geometric characteristic, among the dimensions, shape and/or position of the matrix of the second area.

During this step, the correspondence established during the encoding 307 is verified to give an indication of the authenticity or not of the code.

The method then comprises a step 409 of comparing print variation rates. Preferably, each predefined variation rate defines a limit value above which a document is considered to be a copy. Therefore, during the comparison step if the print variation rate determined is greater than the print variation rate predefined, during a step 410 of verifying the authenticity of the document, the document will be indicated as being a copy.

Of course, the variation rate determined can be a combination, as indicated above.

Figure 5:
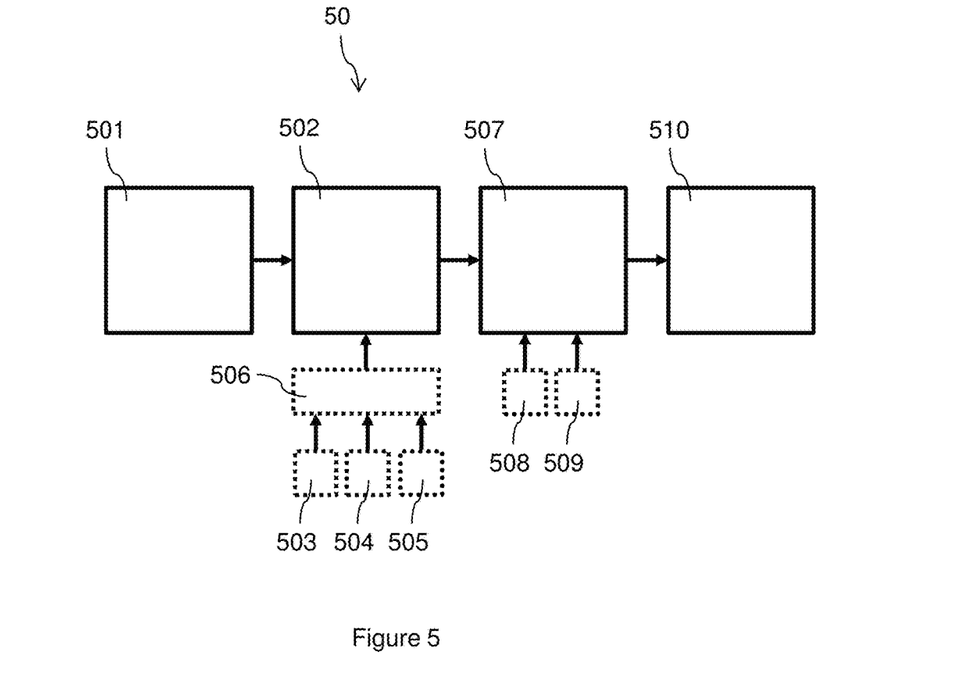
FIG. 5 represents, schematically, a first embodiment of a securing device that is the subject of the present invention.

FIG. 5 shows a particular embodiment of a device 50 for securing a document 70, which device comprises:
- a means 501 for statistically determining the average amplitude of an unpredictable print variation, dot by dot, of at least one geometric characteristic among the dimensions, shape and/or position of the dot;
- a means 502 for generating a message representative of at least one predefined print variation rate;
- a means 507 for encoding the message generated in a 2D barcode 20, 80, 90 comprising a plurality of cells, 10 and 21, 81, 91, at least one cell 10 comprising at least one set of two areas 105, 106, each area 105, 106 comprising a plurality of dots, a set comprising:
  - a first area 105 representing a symbol 107 and
  - a second area 106, different from the first area 105, representing a matrix of dots 108, a matrix 108 of dimensions smaller than the dimensions of the second area 106 and having at least one geometric characteristic, among the dimensions, shape and/or position, of the order of magnitude of the average amplitude of the statistically determined unpredictable print; and
- a means 510 for printing the document with the barcode 20, 80, 90, this printing, as a result of unanticipated unknowns in printing, causing an unpredictable variation, dot by dot, of at least one geometric characteristic of the printed dots among the dimensions, shape and/or position, the printed 2D barcode 20, 80, 90 therefore representing two variations, one generated and the other unpredictable dot by dot.

Preferably, the embodiments of the device 50 are configured to implement the step of the method and their embodiments as described above, and the method 30 and its different embodiments can be implemented by the embodiments of the device 50.

The statistical determination means 501 can also be referred to as "determiner", the generation means 502 can also be referred to as "generator", the encoding means 507 can also be referred to as "encoder", the print means 510 can also be referred to as "printer".

The means for statistical determination 501, generation 502, encoding 507 are for example a program implemented through a computer.

The print means 501 can be any means for printing or marking known to the person skilled in the art.

Figure 6:
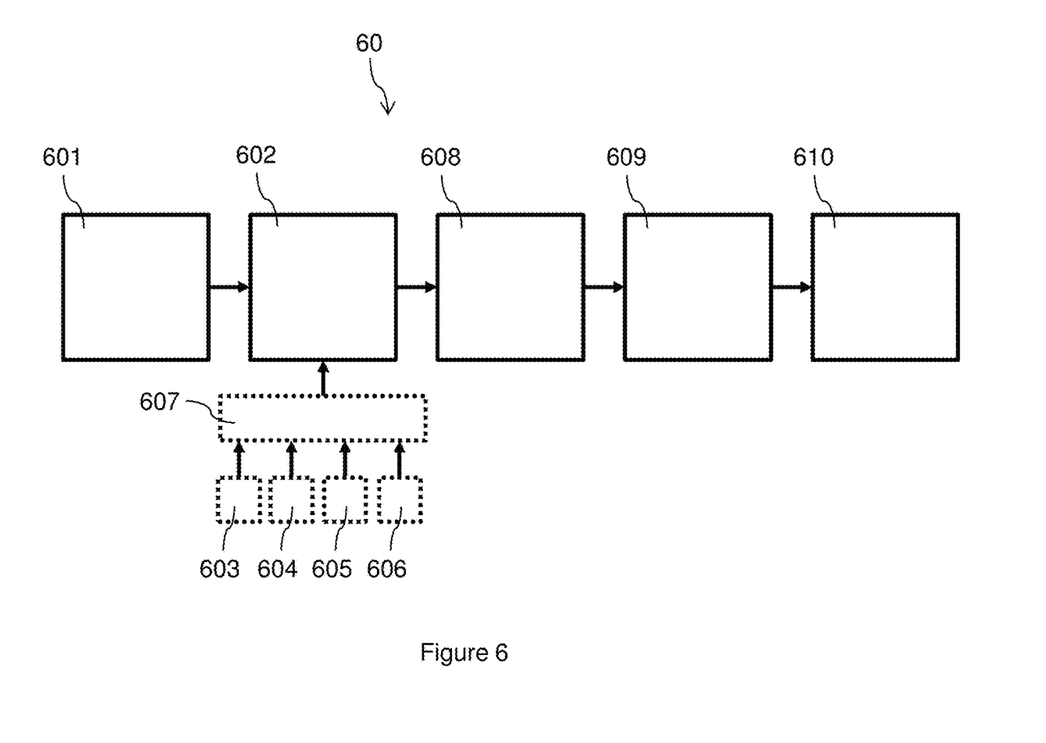
FIG. 6 represents, schematically, a first embodiment of an authentication device that is the subject of the present invention.

FIG. 6 shows a particular embodiment of a device 60 for authenticating a document comprising a 2D barcode 20, 80, 90 comprising a plurality of cells, at least one cell comprising at least one set of two areas 105, 106, each area 105, 106 comprising a plurality of dots, a set comprising:
- a first area representing a symbol and
- a second area, different from the first area, representing a matrix of dots, a matrix of dimensions smaller than the dimensions of the second area, the device 60 comprising:
- a means 601 for capturing an image of a 2D barcode printed with the document;
- a means 602 for decoding a message encoded in the captured barcode, the message comprising at least one predefined print variation rate;
- a means 608 for determining an unpredictable print variation rate of the captured barcode;
- a means 609 for comparing variation rates;
- a means 610 for verifying the authenticity of the document on the basis of the result of the comparison.

Preferably, the embodiments of the device 60 are configured to implement the steps of the method and their embodiments as described above, and the method 40 and its different embodiments can be implemented by the embodiments of the device 60.

The capture means 601 can also be referred to as "reader", the decoding means 602 can also be referred to as "decoder", the determination means 608 can also be referred to as "determiner", the comparison means 609 can also be referred to as "comparator", the verification means 601 can also be referred to as "verifier".

The means for decoding 608, determination 609, comparison 601 are for example a program utilised by a computer.

The capture means 601 can be any means for capturing a 2D barcode, for example a photo camera, a camera or a scanner.

Figure 7:
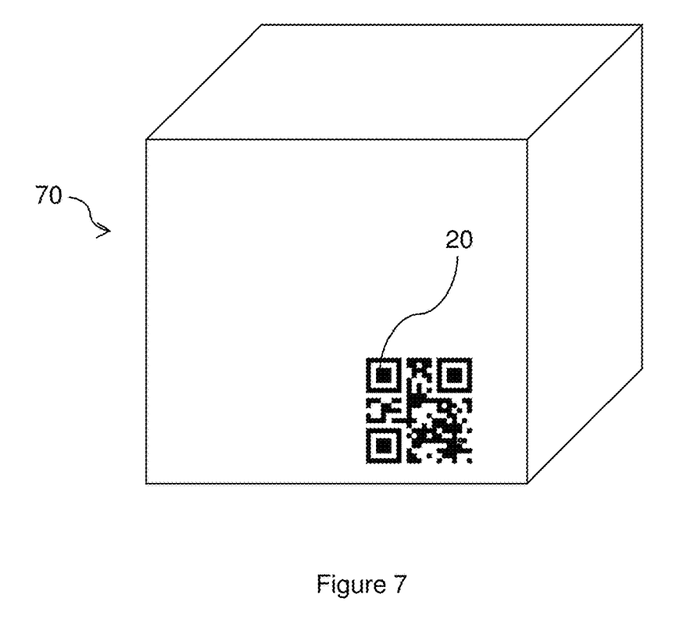
FIG. 7 represents, schematically, a first embodiment of a document secured according to the method that is the subject of the present invention.

FIG. 7 represents a document 70 secured by a securing method 30 that is the subject of the present invention. The document 70 comprises a 2D barcode 20, 80, 90 encoded and printed according to the securing method 30.

The invention claimed is:

1. A Method for securing a document, comprising:
   a step of statistically determining the average amplitude of an unpredictable print variation, dot by dot, of at least one geometric characteristic among the dimensions, shape and/or position of the dot;
   a step of generating a message representative of at least one predefined print variation rate;
   a step of encoding the message generated in a 2D barcode comprising a plurality of cells, at least one cell comprising at least one set of two areas, each area comprising a plurality of dots, a set comprising:
   a first area including dots representing a symbol, and
   a second area, different from the first area, including a matrix of dots, wherein said matrix of dots has dimensions smaller than the dimensions of the second area and having at least one geometric characteristic, among the dimensions, shape and/or position, of the order of magnitude of the average amplitude of the statistically determined unpredictable print variation; and
   a step of printing the document with the barcode, this printing, as a result of unanticipated unknowns in printing, causing an unpredictable variation, dot by dot, of at least one geometric characteristic of the printed dots among the dimensions, shape and/or position, the printed 2D barcode therefore representing two variations, one generated and the other unpredictable dot by dot.

2. The method for securing a document according to claim 1, wherein the message comprises a rate of redundancies configured to correct reading errors linked to predictable and unpredictable print variations.

3. The method for securing a document according to claim 1, wherein the message represents at least the step of encoding at least each first area and/or each second area of the 2D barcode.

4. The method for securing a document according to claim 1, wherein the message represents at least one access to the barcode stored in a memory.

5. The method for securing a document according to claim 1, wherein, for at least one cell, at least one geometric characteristic, among the dimensions, shape and/or position of the matrix of the second area, is dependent on the symbol represented in the first area.

6. The method for securing a document according to claim 1, wherein the message represents a weighted combination of at least two predefined print variation rates.

7. The method for securing a document according to claim 1, wherein each set of one cell has an equal number of dots.

8. The method for securing a document according to claim 1, wherein at least one portion of the message is represented in at least one portion of the symbols of at least one cell.

9. A document secured by a securing method according to claim 1.

10. A method for authenticating a document comprising a 2D barcode comprising a plurality of cells, at least one cell comprising at least one set of two areas, each area comprising a plurality of dots, a set comprising:
    a first area including dots representing a symbol and
    a second area, different from the first area, including a matrix of dots, wherein said matrix of dots has dimensions smaller than the dimensions of the second area,
    the method being characterised in that it comprises:
    a step of capturing an image of a 2D barcode printed with the document;
    a step of decoding a message encoded in the captured barcode, the message comprising at least one predefined print variation rate;
    a step of determining an unpredictable print variation rate of the captured barcode;
    a step of comparing variation rates;
    a step of verifying the authenticity of the document on the basis of the result of the comparison.

11. The method for authenticating a document according to claim 10, wherein the step of determining an unpredictable print variation rate comprises a step calculating a rate of redundancies used, during the decoding step, to correct reading errors linked to predictable and unpredictable print variations.

12. The method for authenticating a document according to claim 10, wherein the step of determining a print variation rate comprises:
    a step of encoding at least each first area and/or each second area of the 2D barcode; and
    a step of the dot-by-dot comparison of each first area and/or each second area of the 2D barcode captured and of the barcode encoded, the result of the comparison being the determined print variation rate.

13. The method for authenticating a document according to claim 12, wherein the dot-by-dot comparison step comprises a step of verifying, for each set of each cell, the correspondence between the symbol and a geometric characteristic, among the dimensions, shape and/or position of the matrix of the second area.

14. The method for authenticating a document according to claim 10, wherein the step of determining a variation rate comprises:
- a step of accessing the barcode stored in a memory;
- a step of the dot-by-dot comparison of each first area and/or each second area of the 2D barcode captured and of the barcode memorised, the result of the comparison being the determined print variation rate.

15. The method for authenticating a document according to claim 10, wherein the message represents a weighted combination of at least two predefined print variation rates, and during the determination step at least two unpredictable print variation rates of the captured barcode, corresponding to the predefined print variation rates, are combined.

16. A device for securing a document, comprising:
- a means for statistically determining the average amplitude of an unpredictable print variation, dot by dot, of at least one geometric characteristic among the dimensions, shape and/or position of the dot;
- a means for generating a message representative of at least one predefined print variation rate;
- a means for encoding the message generated in a 2D barcode comprising a plurality of cells, at least one cell comprising at least one set of two areas, each area comprising a plurality of dots, a set comprising:
  - a first area including dots representing a symbol, and
  - a second area, different from the first area, including a matrix of dots, wherein said matrix of dots has dimensions smaller than the dimensions of the second area and having at least one geometric characteristic, among the dimensions, shape and/or position, of the order of magnitude of the average amplitude of the statistically determined unpredictable print variation; and
- a means for printing the document with the barcode, this printing, as a result of unanticipated unknowns in printing, causing an unpredictable variation, dot by dot, of at least one geometric characteristic of the printed dots among the dimensions, shape and/or position, the printed 2D barcode therefore representing two variations, one generated and the other unpredictable dot by dot.

17. A device for authenticating a document comprising a 2D barcode comprising a plurality of cells, at least one cell comprising at least one set of two areas, each area comprising a plurality of dots, a set comprising:
- a first area including dots representing a symbol and
- a second area, different from the first area, including a matrix of dots, wherein said matrix of dots has dimensions smaller than the dimensions of the second area, the device comprising:
- a means for capturing an image of a 2D barcode printed with the document;
- a means for decoding a message encoded in the captured barcode, the message comprising at least one predefined print variation rate;
- a means for determining an unpredictable print variation rate of the captured barcode;
- a means for comparing variation rates;
- a means for verifying the authenticity of the document on the basis of the result of the comparison.

* * * * *